United States Patent
Zuo et al.

(10) Patent No.: US 12,303,065 B2
(45) Date of Patent: May 20, 2025

(54) DAMPING DEVICE, COOKER, AND DEVICE HAVING DAMPING STRUCTURE

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Shuangquan Zuo, Zhuhai (CN); Qun Chen, Zhuhai (CN); Kanggui Lin, Zhuhai (CN); Biao Xiao, Zhuhai (CN); Zhichen Sun, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

(*) Notice: Subject to any disclaimer, the term of this patent is extended or adjusted under 35 U.S.C. 154(b) by 0 days.

(21) Appl. No.: 18/408,232

(22) Filed: Jan. 9, 2024

(65) Prior Publication Data

US 2024/0138615 A1 May 2, 2024

Related U.S. Application Data

(62) Division of application No. 16/758,357, filed as application No. PCT/CN2018/107189 on Sep. 25, 2018, now Pat. No. 11,903,520.

(30) Foreign Application Priority Data

Nov. 28, 2017 (CN) .......................... 201711216558.3
Jan. 8, 2018 (CN) .......................... 201810014765.9
(Continued)

(51) Int. Cl.
*F16F 9/34* (2006.01)
*A47J 27/08* (2006.01)
(Continued)

(52) U.S. Cl.
CPC ............... *A47J 36/12* (2013.01); *A47J 27/08* (2013.01); *A47J 36/10* (2013.01); *F16F 1/38* (2013.01);
(Continued)

(58) Field of Classification Search
CPC . E05D 11/082; E05D 11/105; E05D 11/1014; F16F 2232/02; F16F 7/06; F16F 7/065; A47J 36/06; A47J 36/12
See application file for complete search history.

(56) References Cited

U.S. PATENT DOCUMENTS 7,350,664 B2 * 4/2008 Nam .......................... E05F 1/12
220/264
2006/0272128 A1 * 12/2006 Rude ..................... E05D 11/084
16/342

FOREIGN PATENT DOCUMENTS

CN 201332940 Y * 10/2009

OTHER PUBLICATIONS

Machine translation of CN 201332940 (no date).*

* cited by examiner

*Primary Examiner* — Nicholas J Lane

(57) ABSTRACT

The present disclosure discloses a damping device, a cooker and a device having a damping structure, wherein the damping device is arranged between a main body and a cover body, comprising a rotary member (2) fixed on the cover body; a fixed member (11) fixed on the main body, the fixed member (11) being a hollow body having openings at two ends, the rotary member (2) being nested in the hollow body, one of the rotary member (2) and an inner side wall of the hollow body being provided with a friction member (21), the other one being provided with an elastic piece (14); during the process of opening the cover body, the elastic piece (14) is slidably fitted with the friction member (21) and (Continued)

generates varying frictional resistance during sliding. The damping device is less susceptible to outside temperature and humidity and thus is less likely to fail.

6 Claims, 12 Drawing Sheets

(30) Foreign Application Priority Data

| | | |
|---|---|---|
| May 7, 2018 | (CN) | 201820675962.0 |
| May 25, 2018 | (CN) | 201810515639.1 |
| May 25, 2018 | (CN) | 201810516299.4 |

(51) Int. Cl.
    *A47J 36/10*      (2006.01)
    *A47J 36/12*      (2006.01)
    *F16F 1/38*      (2006.01)
    *A47J 27/00*      (2006.01)
    *A47J 27/09*      (2006.01)

(52) U.S. Cl.
    CPC ............ *A47J 27/002* (2013.01); *A47J 27/004* (2013.01); *A47J 27/0802* (2013.01); *A47J 27/09* (2013.01)

DAMPING DEVICE, COOKER, AND DEVICE HAVING DAMPING STRUCTURE

CROSS-REFERENCE TO RELATED APPLICATIONS

This application is a divisional application of U.S. application Ser. No. 16/758,357. This application claims priorities from U.S. application Ser. No. 16/758,357, filed Apr. 22, 2020, PCT Application No. PCT/CN2018/107189, filed Sep. 25, 2018, and CN Application No. 201711216558.3, filed Nov. 28, 2017, CN Application No. 201810014765.9, filed Jan. 8, 2018, CN Application No. 201810515639.1, filed May 25, 2018, CN Application No. 201810516299.4, filed May 25, 2018, and CN Application No. 201820675962.0, filed May 7, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the technical field of household appliances, and specifically to a damping device, a cooker and a device having a damping structure.

BACKGROUND ART

A household cooker (such as an electric rice cooker) generally comprises a cooking body and a lid connected thereto through a rotary shaft which is provided with a torsion spring; two torsion spring arms of the torsion spring are abutted against the lid and the cooking body respectively, and while being opened, the lid springs open under the action of the torsion spring. In the prior art, a rubber damping block is added at an opening structure of the lid for control in order to achieve smooth spring opening of the lid. However, the rubber damping block is susceptible to thermal expansion and contraction due to exposure to the ambient. After being used for a period of time at a high temperature, the surface of the rubber damping block will be damaged because of lasting extrusion, as a result of which, the damping becomes ineffective, and the lid of the cooker suffers from the problems such as non-full-opening or jumping open. This leads to poor user experience. In addition, as the cooperation between the rubber damping block and the matching parts thereof takes place at the outer side, larger space needs to be occupied for their cooperation, thereby increasing the size of the cooker.

Generally, a cooking appliance such as an electric rice cooker and an electric pressure cooker includes a cooking body and a lid rotatably connected to the cooking body by means of a rotary shaft onto which a plurality of torsion springs is sleeved. Two legs of the torsion springs abut against the cooking body and the lid respectively. In order to prevent the whole cooking appliance from jumping and shaking caused by an excessive elastic force of the torsion springs, a rubber damping block is usually arranged between the cooking body and the lid, such that the torsion springs and the rubber damping block jointly control the opening and closing of the electric rice cooker or the electric pressure cooker.

However, as the rubber damping block is susceptible to expansion and contraction when heated and cooled, and the surface thereof will be damaged due to lasting extrusion after being used for a period of time, the lid suffers from the problems of non-full-opening and jumping open, which results in poor damping effect and use effect.

All the damping devices in the market at present have disadvantages. The following is an illustration of the defects of the damping devices used in cookers.

Currently, the lid opening structure of a cooker is mainly controlled by a spring and a rubber damping block. The control is achieved by the rubber damping block at the lid opening structure of the cooker. The existing damping device used in a cooker has a complicated structure, and needs to cooperate with another supporting member that is interacting with an outer casing in the process of opening and closing the cover body, so that the outer casing is subject to stress and contacts with the cooking body of the cooker to create a stress point. The existing damping device has a complicated structure as it includes another supporting member, and thus occupies larger space.

The lid opening structure currently used in the existing electric rice cooker is mainly controlled by a spring and a rubber damping block. Because the rubber damping block is susceptible to expansion and contraction when heated and cooled, and the surface thereof will be damaged due to lasting extrusion after being used for a period of time, the lid of the electric rice cooker suffers from the problems of non-full-opening or jumping open, which leads to poor use effect.

On the other hand, the damper currently used generally does not have a function of limiting, such that excessive displacement or greater angle of a movement will severely affect the damping structure, thus shortening its service life, and affecting the reliability and use effect of the damper.

Therefore, a heretofore unaddressed need exists in the art to address the aforementioned deficiencies and inadequacies.

SUMMARY OF THE INVENTION

In view of the above defects, the objective of the present disclosure is to provide a damping device, a cooker and a device having a damping structure, so as to solve such problems in the prior art as failure in damping effect of the rubber damper of a damping device after long time use, large space occupied by the rubber damper, short service life and poor damping effect of the damping structure in the damping device, complex structure and oversize of the damping device, short service life and poor reliability and user experience of the damping device due to lack of a movement limiting structure.

The present disclosure provides a damping device, arranged between a main body and a cover body, comprising:
  a rotary member, fixed on the cover body;
  a fixed member, fixed on the main body, the fixed member being a hollow body having openings at two ends, the rotary member being nested in the hollow body, one of the rotary member and an inner side wall of the hollow body being provided with a friction member, the other one being provided with an elastic piece; during the process of opening the cove body, the elastic piece is slidably fitted with the friction member and generates varying frictional resistance during sliding.

Preferably, the frictional resistance increases gradually during the process of opening the cover body.

Preferably, the friction member is a protrusion.

Preferably, the friction member is formed integrally on the rotary member.

Preferably, the elastic piece is an outwardly protruding elastic sheet.

Preferably, the rotary member is fixed on the cover body by means of a hinge shaft, and is provided with a non-circular hole matched with the shape of the hinge shaft.

Preferably, the non-circular hole is D-shaped.

Preferably, the openings at two ends of the fixed member are provided with sealing covers.

The present disclosure further provides a cooker, comprising a cooking body and a lid hinged onto the cooking body, any one of the above damping devices being arranged between the cooking body and the lid.

Preferably, the lid is hinged onto the cooking body by means of a hinge shaft onto which the rotary member is fixed.

Preferably, the hinge shaft is D-shaped.

Preferably, a torsion spring is provided between the cooking body and the lid to apply a force onto the lid in a direction of opening the lid.

The present disclosure also provides a device having a damping structure, comprising a damping structure, and a first body and a second body rotatably connected by means of a rotary shaft and provided with a torsion spring therebetween;

the damping structure comprises an outer casing and an inner core nested in the outer casing, one of the inner wall of the outer casing and the outer wall of the inner core being provided with a protrusion and the other one being provided with an elastic piece, a first end of the elastic piece being fixedly connected to the inner wall of the outer casing or the outer wall of the inner core, and a second end thereof being arranged in a suspended manner;

the first body is fixed with the outer casing or the inner core, and the second body being rotatable relative to the outer casing by driving the inner core with the rotary shaft;

during at least part of the opening process of the second body relative to the first body, the protrusion extrudes the elastic piece and rotates in a direction from the second end of the elastic piece to the first end of the elastic piece.

Preferably, the protrusion does not reach the first end of the elastic piece when the second body is completely opened relative to the first body.

Preferably, the elastic piece is arranged on the outer casing, and the protrusion is arranged on the inner core.

Preferably, the elastic piece is in an arc shape, and protrudes in a direction away from the outer casing.

Preferably, the outer casing is provided with an opening, the first end of the elastic piece being connected to a side wall of the opening, and the second end being arranged in a suspended manner.

Preferably, the elastic piece is arranged on the inner core, and the protrusion is arranged on the outer casing.

Preferably, the outer casing comprises a casing main body that has an open end and is hollow, and an end cap that is arranged at the open end of the casing main body, a positioning stud being arranged at least at one of the bottom surface of the casing main body and the inner wall surface of the end cap, and the inner core being sleeved on the positioning stud after installation.

Preferably, the inner core is provided with first through-holes along its height direction, and second through-holes are disposed in two ends of the outer casing respectively in positions corresponding to the first through-holes. The first through-holes and the second through-holes serve for passage of a shaft, and the inner core and the shaft cannot rotate relatively.

Preferably, an outer wall of the outer casing is provided with a fixing mechanism used for fixing with a connector to be connected.

Preferably, the device is a cooking appliance, and one of the first body and the second body is a pot lid and the other is a pot body.

The present disclosure provides a damping device arranged between a cover body and a main body; the damping device comprises an inner core an outer side wall of which is provided with a friction member, and an outer casing comprising a fixed member and a supporting member; the inner wall of the fixed member is provided with an elastic piece so that the friction member can be brought into contact with the elastic piece to create damping friction; the supporting member is arranged at an outer periphery of the fixed member and comprises a first cantilever extending in a first direction from an outer peripheral wall of the fixed member and a second cantilever extending in a second direction from the outer peripheral wall of the fixed member.

Preferably, the first direction is opposite to the second direction.

Preferably, the fixed member has a cavity with two open ends, and the inner core can be arranged in the cavity of the fixed member.

Preferably, the fixed member and the supporting member are in a one-piece configuration.

Preferably, a deformation corresponding to the damping friction between the friction member and the elastic piece matches a buffer force corresponding to the damping friction.

Preferably, the friction member of the inner core is a bump protruding from the outer surface of the inner core.

Preferably, the inner core is fixed on the cover body by means of a hinge shaft, and the inner core has a D-shaped hole matching the shape of the hinge shaft.

Preferably, the openings at both ends of the outer casing are provided with end caps.

The present disclosure further provides a cooker comprising the damping device illustrated above.

Preferably, the cooker further comprises a cooking body and a lid fixed thereto, wherein the lid is fixed to the cooking body by means of a hinge shaft to which the inner core is fixed.

Preferably, the hinge shaft is D-shaped.

Preferably, the cooking body is also provided with at least two limiting ribs, and the supporting member can be inserted into a cavity formed by adjacent limiting ribs to limit the supporting member.

Preferably, the limiting ribs have a shape that matches the shape of the supporting member, so that the supporting member can be inserted into the cavity formed by the adjacent limiting ribs, and/or the limiting ribs have a size that matches the size of the supporting member, so that the supporting member can be inserted into the cavity formed by the adjacent limiting ribs.

The present disclosure also provides a damping device comprising a housing and an inner core which is rotatably arranged in the housing; a limiting portion is also arranged in the housing for limiting the movement of the inner core.

Preferably, the housing comprises a main body in a cylindrical form and a mounting portion connected to an outer wall of the main body.

Preferably, the housing is provided with a damping structure therein on which the limiting portion is arranged.

Preferably, the damping structure is in an elongated shape, and has one end fixed to the inner wall of the housing, and the other end being a free end.

Preferably, an end of the damping structure connected with the inner wall of the housing extends in a circumferential direction of the inner wall of the housing.

Preferably, the damping structure is an arc structure; or, a surface of the damping structure approximate to the inner core is an arc surface.

Preferably, a portion of the damping structure intermediate the two ends has a thickness greater than a thickness of the two ends of the damping structure.

Preferably, the limiting portion is approximate to the end of the damping structure connected with the inner wall of the housing.

Preferably, the limiting portion includes a protrusion formed on a surface of the damping structure in contact with the inner core.

Preferably, a dodge structure is arranged at a position of the inner wall of the housing corresponding to the damping structure. The dodge structure provides space for deformation of the damping structure.

Preferably, the inner core includes a bump that is able to contact and press the damping structure during rotation of the inner core.

Preferably, the damper further includes an end cap that limits the inner core within the housing.

The present disclosure further provides a cooker comprising a cooking body and a lid which are rotatably connected by means of a hinge shaft; and the stewing means also comprises the damper illustrated above for providing damping to the rotation of the cover body relative to the cooking body.

The present disclosure provides a damping device arranged between a cover body and a main body. The damping device comprises an inner core an outer side wall of which is provided with a friction member, and an outer casing comprising a fixed member. The inner wall of the fixed member is provided with an elastic piece so that the friction member can be brought into contact with the elastic piece to create damping friction. The fixed member is provided with a cavity having openings at two ends so as to arrange the inner core in the cavity of the fixed member. The fixed member has a square-shaped outer contour.

Preferably, a notch is formed in an outer peripheral wall of the fixed member at a position corresponding to the elastic piece. The position of the inner wall of the fixed member abutting against the elastic piece has an arc structure which is at the position of the notch.

Preferably, the outer casing further includes a supporting member for fixing the outer casing to the main body.

Preferably, the fixed member and the supporting member are in a one-piece configuration.

Preferably, a deformation corresponding to the damping friction between the friction member and the elastic piece matches a buffer force corresponding to the damping friction.

Preferably, the friction member of the inner core is a bump protruding from the outer surface of the inner core.

Preferably, the inner core is fixed on the cover body through a hinge shaft, and the inner core has a D-shaped hole matching the shape of the hinge shaft.

Preferably, the openings at both ends of the outer casing are provided with end caps.

Preferably, the fixed member has a first end face and a second end face opposite to each other, and the cavity is formed in the fixed member and runs through the first end face and the second end face. The inner core is arranged in the cavity.

Preferably, the end cap comprises a first end cap and a second end cap, wherein the shape of the first end cap matches the shape of the first end face, and the shape of the second end cap matches the shape of the second end face.

Corresponding with the above, another aspect of the present disclosure provides a cooker comprising the damping device described above.

Preferably, the cooker further comprises a cooking body and a lid fixed on the cooking body, wherein the lid is fixed on the cooking body by means of a hinge shaft to which the inner core is fixed.

Preferably, the hinge shaft is D-shaped.

The present disclosure has the following advantageous effects:

1. The damping device illustrated in the present disclosure is arranged between the main body and the cover body, and comprises a rotary member fixed on the cover body and a fixed member fixed on the main body, wherein the fixed member is a hollow body having openings at both ends; the rotary member is nested in the hollow body; one of the rotary member and the inner side wall of the hollow body is provided with a friction member, the other one being provided with an elastic piece. During the opening of the cove body, the elastic piece is slidably fitted with the friction member and generates a varying frictional resistance during sliding. The rotary member in the damping device is wrapped in the fixed member, and the matched friction member and the elastic piece are also within the fixed member. Therefore, the damping device of the present disclosure is less susceptible to outside temperature and humidity and thus is less likely to fail. In addition, the rotary member is arranged in the fixed member and part of the volume of the rotary member overlaps part of the volume of the fixed member, occupying smaller space.

2. In the damping device described in the present disclosure, the frictional resistance increases gradually during the process of opening the cover body to enable smooth opening of the cover body. In the damping device described in the present disclosure, the friction member is a protrusion, which has a simple structure and is easily to be manufactured at low cost. In the damping device described in the present disclosure, the friction member is formed integrally on the rotary member to reduce manufacturing steps and further reduce cost. In the damping device described in the present disclosure, the elastic piece is an outwardly protruding elastic sheet, and has an elasticity gradually changing during the process of fitting the friction member with the elastic piece to enable smooth transition. In the damping device described in the present disclosure, the rotary member is fixed on the cover body by a hinge shaft, and the rotary member has a non-circular hole matched with the shape of the hinge shaft, thus achieving simple production and reliable transmission fitting.

3. According to the device with the damping structure provided by the present disclosure, the damping structure has a more stable structure and longer service life, to solve the problems of non-full-opening and jumping open in the process of opening the existing cooking appliances as much as possible and creates better damping effect and user experience, and has a simple structure and can be assembled and produced easily with a small volume at low cost. More importantly, during at least part of the process of opening the second body relative to the first body, the protrusion rotates from a suspended end of the elastic piece to a fixed end thereof. At an earlier stage of this process, the elastic force of the elastic sheet shows a longer linear change area, which allows easy selection of the elastic sheet as well as control of the elastic force of the elastic sheet, while in the later stage of this process, since the protrusion does not reach the fixed end of the elastic sheet, the fixed end of the elastic sheet is subject to less stress and slight deformation, and is less likely to be fractured and has longer service life and high reliability of the whole structure.

4. The damping device according to the present disclosure is arranged between a cover body and a main body; the damping device comprises an inner core an outer side wall of which is provided with a friction member, and an outer casing which comprises a fixed member and a supporting member. The inner wall of the fixed member is provided with an elastic piece such that the friction member and the elastic piece can be brought into contact to create damping friction; the supporting member is disposed at an outer periphery of the fixed member and comprises a first cantilever extending toward a first direction from the outer peripheral wall of the fixed member and a second cantilever extending toward a second direction from the outer peripheral wall of the fixed member. In this way, the outer casing can provide a stress point for itself by using the first cantilever and the second cantilever of the supporting member to bring the outer casing into contact with the cooking body of the cooker, thereby obtaining a damping device with a simple structure and small occupied space.

5. The damping device of the present disclosure has a first direction and a second direction opposite to each other. In this case, the outer casing can provide a stress point for itself by using the first cantilever and the second cantilever of the supporting member to bring the outer casing into contact with the cooking body of the cooker, thereby obtaining a damping device with a simple structure and small occupied space. In the technical solution of the present disclosure, the fixed member has a cavity having openings at both ends, and the inner core can be arranged in the cavity of the fixed member such that the inner core and the outer casing cooperate with each other.

6. The damping device according to the present disclosure is arranged between a cover body and a main body; the damping device comprises an inner core an outer side wall of which is provided with a friction member, and an outer casing which comprises a fixed member and a supporting member. The inner wall of the fixed member is provided with an elastic piece such that the friction member and the elastic piece can be brought into contact to create damping friction; the supporting member is disposed at an outer peripheral wall of the fixed member and comprises a first cantilever extending toward a first direction from the outer peripheral wall of the fixed member and a second cantilever extending toward a second direction from the outer peripheral wall of the fixed member. The outer casing of the present disclosure comprises a fixed member and a supporting member which is disposed at an outer periphery of the fixed member and which comprises a first cantilever extending toward a first direction from the outer peripheral wall of the fixed member and a second cantilever extending toward a second direction from the outer peripheral wall of the fixed member. In this way, the outer casing can provide a stress point for itself by using the first cantilever and the second cantilever of the supporting member, so that the outer casing contacts with the cooking body of the cooker, thereby obtaining a damping device with a simple structure and small occupied space.

7. According to the damping device of the present disclosure, a limiting structure arranged in the housing may function to limit the movement of the inner core to prevent excessive movement of the inner core and protect the damper, thereby increasing the service life of the damper and creating better use effect and higher reliability.

8. In the technical solution of the present disclosure, the damping device is arranged between a cover body and a main body and comprises an inner core an outer side wall of which is provided with a friction member, and an outer casing which comprises a fixed member. The inner wall of the fixed member is provided with an elastic piece such that the friction member and the elastic piece can be brought into contact to create damping friction. The fixed member has a cavity having openings at both ends so as to arrange the inner core therein. The fixed member has a square outer contour. In this way, due to the square shape of the outer contour of the fixed member of the outer casing, the area of the outer casing is increased. Because of the increase in the area, the outer casing of the damping device will have increased strength and will be less likely to be damaged. At the meantime, the service life of the damping device is increased.

9. According to the technical solution of the present disclosure, a notch is formed on the outer peripheral wall of the fixed member at a position corresponding to the elastic piece. The position of the inner wall of the fixed member abutting against the elastic piece has an arc structure which is at the position of the notch. This facilitates the contact between the friction member of the inner core and the elastic piece of the fixed member, thereby creating damping friction due to the contact to generate a buffer force for smoothly opening or closing the cover body.

10. According to the technical solution of the present disclosure, the outer casing further includes a supporting member for fixing the outer casing to the main body. Therefore, the outer casing can be fixed to the main body by the supporting member. Thus, in the technical solution of the present disclosure, the damping device is arranged between the main body and the cover body, and comprises an inner core an outer side wall of which is provided with a friction member, and an outer casing which comprises a fixed member. The inner wall of the fixed member is provided with an elastic piece such that the friction member and the elastic piece can be brought into contact to create damping friction. The fixed member has a cavity having openings at both ends so as to arrange the inner core in the cavity of the fixed member. The fixed member has a square outer contour. In this way, due to the square shape of the outer contour of the fixed member of the outer casing, the area of the outer casing is increased. Because of the increase in the area, the outer casing of the damping device will have increased strength and will be less likely to be damaged. At the meantime, the service life of the damping device is increased.

Other features and advantages of the present disclosure will be illustrated in the description below, and will become apparent partly from the description, or may be understood by carrying out the present disclosure.

The technical solution of the present disclosure will be described in detail with reference to the drawings and embodiments.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Figure 1:
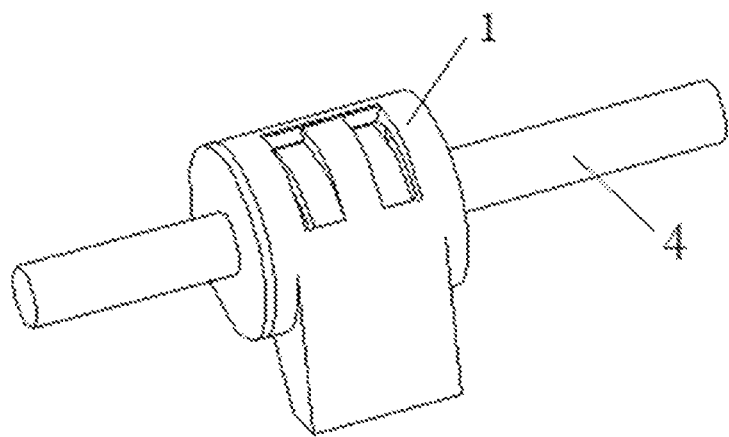
FIG. 1 is a perspective view of a damping device in Embodiment 1 of the present disclosure.

Referring to the drawings, the reference numerals in the embodiments of the present disclosure are as follows:

1. outer casing (or housing); 11. fixed member (or casing body, or fixed piece, or main body); 12. supporting member (or fixing mechanism or mounting portion); 13. opening (or notch); 14. elastic piece (or elastic sheet or damping structure); 15. dodge structure; 16. limiting portion; 2. inner core (or rotary member); 21. protrusions (or friction member or bump); 22. first through-hole (or limiting hole); 3. end cap (or sealing cap); 31. positioning stud (or second supporting member); 32. second through-hole; 4. hinge shaft; 5. baffle; 51. first supporting member; 52. first through-hole; 6. cooker; 7. limiting ribs.

DETAILED DESCRIPTION OF THE EMBODIMENTS

In order to make the objective, technical solution and advantages of the present disclosure clearer, the technical solution of the present disclosure will be illustrated clearly and completely with reference to the embodiments and corresponding drawings. Apparently, the embodiments to be described are only some of the embodiments, but not all of the embodiments of the present disclosure. Other embodiments obtained, based on the embodiments of the present disclosure, by those skilled in the art without paying any creative effort shall be considered as being within the protection scope of the present disclosure.

Embodiment 1

Figure 2:
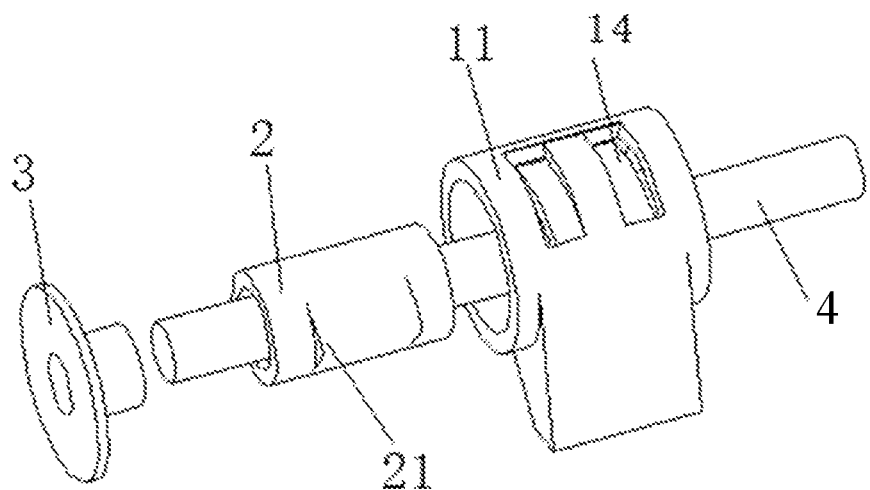
FIG. 2 is an exploded view of FIG. 1.
Figure 3:
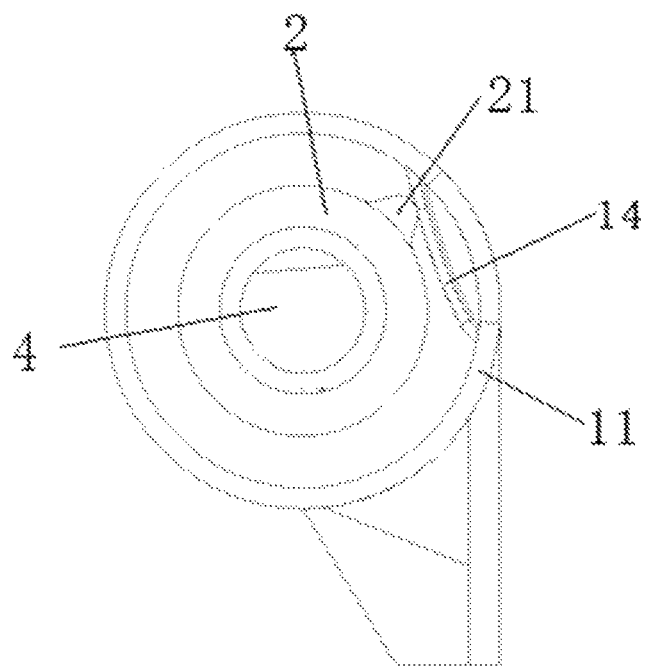
FIG. 3 is a side view of FIG. 1 without mounting a sealing cover.
Figure 4:
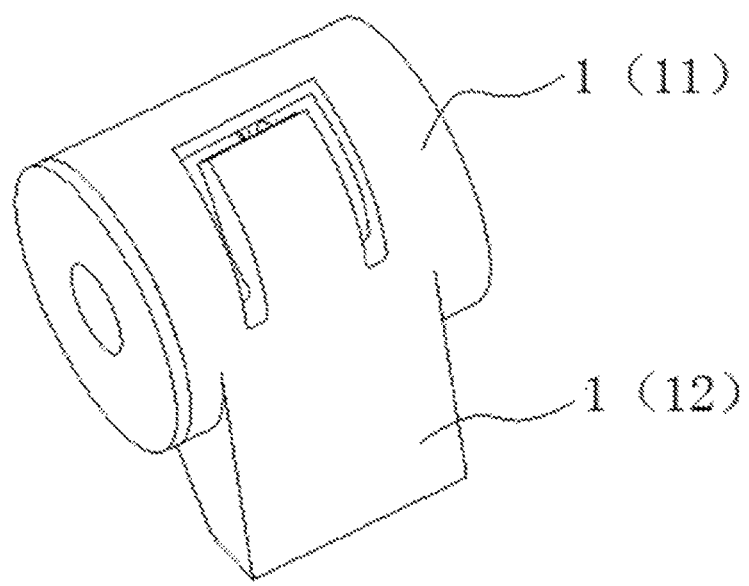
FIG. 4 is a structural view of the damping structure provided in Embodiment 2 of the present disclosure.
Figure 5:
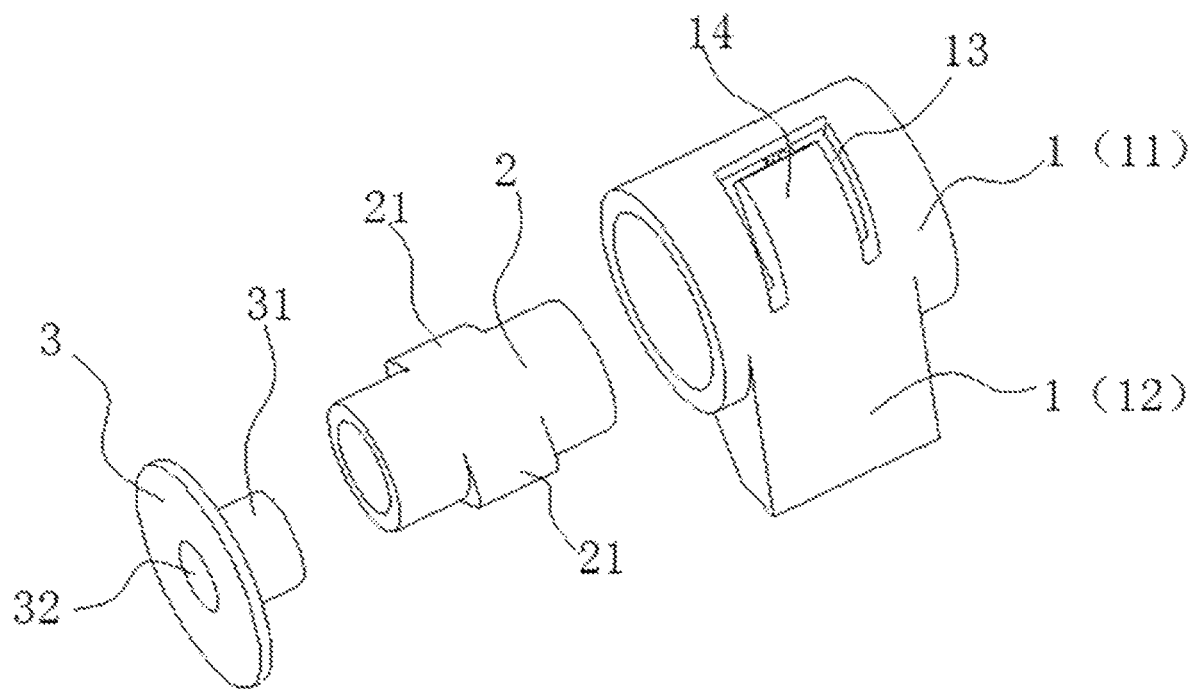
FIG. 5 is an exploded structural view of the damping structure provided in Embodiment 2 of the present disclosure.

As shown in FIGS. 1-3, a cooker comprises a cooking body and a lid hinged thereto. A damping device is arranged between the cooking body and the lid. The damping device, arranged between the cooking body and the lid, comprises a fixed member 11 fixed to the lid and to the cooking body. The fixed member 11 is a hollow body having openings at both ends, in which hollow body a rotary member 2 is nested. The rotary member 2 is provided with a friction member 21 and an elastic piece 14 is arranged on an inner side wall of the hollow body. During the opening of the lid, the elastic piece 14 is slidably fitted with the friction member 21 and generates a varying frictional resistance during sliding. The frictional resistance may be designed to increase gradually during the opening process. Of course, the change of frictional resistance may be designed according to actual needs. The friction member 21 may be a protrusion. In this embodiment, the friction member 21 is integrally formed on the rotary member 2, as shown in FIG. 2. The elastic piece 14 is an outwardly protruding elastic sheet and is fixedly arranged on the inner side wall of the hollow body. The openings at both ends of the fixed member 11 may also be provided with sealing covers 3 to seal the rotary member 2 in the fixed member 11.

The rotary member 2 is fixed to the lid by means of a hinge shaft 4, and has a non-circular hole adapted to the shape of the hinge shaft 4. In this embodiment, the non-circular hole is D-shaped, and the hinge shaft 4 is a D-shaped shaft, as illustrated in FIG. 3.

The lid is hinged on the cooking body by means of the hinge shaft 4 to which the rotary member 2 is fixed. A torsion spring is also arranged between the cooking body and the lid to apply a force onto the lid in an opening direction thereof.

A damping device, arranged between a main body and a cover body, comprises the rotary member 2 fixed to the cover body and the fixed member 11 fixed to the main body. The fixed member 11 is a hollow body in which the rotary member 2 is nested. The inner side wall of the hollow body is provided with a friction member 21 and the rotary member 2 is provided with an elastic piece 14. During the opening of the lid, the elastic piece 14 is slidably fitted with the friction member 21 and generates a varying frictional resistance during sliding.

Embodiment 2

As shown in FIGS. 4-7, the embodiment of the present disclosure provides a cooking appliance having a damping structure, such as an electric rice cooker or an electric pressure cooker.

The cooking appliance (not shown) in this embodiment comprises a pot body, a pot lid, a rotary shaft, a torsion spring and a damping structure. The pot lid is rotatably connected to the pot body by means of the rotary shaft. The torsion spring is sleeved on the rotary shaft. Two legs of the torsion spring are respectively abutted against the pot body and the pot cover, wherein the number of the torsion spring is preferably but not limited to at least two, and may be one or more than two as needed.

As illustrated in FIGS. 4-7, the damping structure comprises an outer casing 1 and an inner core 2 nested in the outer casing 1. An inner wall of the outer casing 1 is provided with an elastic sheet 14 which has a first end fixedly connected to the inner wall of the outer casing 1 and a second end arranged in a suspended manner. An outer wall of the inner core 2 is provided with a protrusion 21. One of the pot lid and the pot body is fixed with the outer casing 1 or the inner core 2, and the other one is rotatable relative to the outer casing 1 by driving the inner core 2 with the rotary shaft. During at least part of the relative rotation of the inner core 2 and the outer casing 1, the protrusion 21 rotates relative to the elastic sheet 14 and extrudes a wall surface of the elastic sheet 14. The elastic sheet 3 is extruded to deform and generate a resistance against the relative rotation between the inner core 2 and the outer casing 1, thereby hindering the relative rotation between the pot lid and the pot body. The damping structure has a more stable structure and longer service life and is capable of preventing problems such as non-full-opening and jumping open during the opening of the existing cooking appliances as much as possible, and produces better damping effect and user experience with simple structure and small volume, and can be assembled and manufactured easily at low cost.

The elastic piece 14 and the protrusion 21 are preferably but not limited to be made of plastic or metal material. The number of the elastic piece 14 and of the protrusion 21 is preferably but not limited to two respectively, and may be one or more than two respectively. The elastic piece 3 is preferably in an arc shape and protrudes in a direction away from the outer casing 1 to simplify the structure and provide greater elasticity. More preferably, in order to facilitate processing, the outer casing 1 is provided with an opening 13, a first end of the elastic piece 14 being connected to a side wall of the opening 13, and a second end thereof being arranged in a suspended manner.

Figure 6:
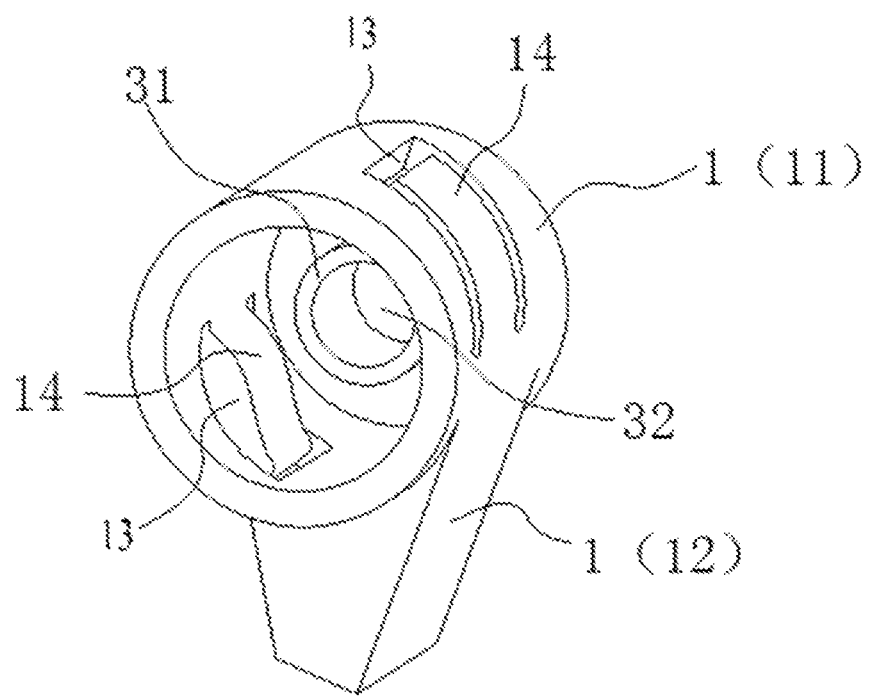
FIG. 6 is a structural view of the outer casing provided in Embodiment 2 of the present disclosure after removal of the end cap.

Referring to FIG. 6, preferably, both the outer casing 1 and the inner core 2 are generally in a cylindrical form. For easy assembly and use, the outer casing 1 comprises a casing body 11 having an open end and being hollow, and an end cap 3 arranged at the open end of the casing body 11. On a bottom surface of the casing body 11 and an inner wall surface of the end cap 3 are arranged positioning studs 31 respectively, onto which both ends of the inner core 2 are sleeved after installation. Of course, it should be understood that only the bottom surface of the casing body 11 or the inner wall surface of the end cap 3 being provided with a positioning stud 31 is a variation of the embodiment. It should be understood that the shapes of the outer casing 1 and the inner core 2 are not limited thereto, as long as the inner core 2 can be nested in the outer casing 1 and rotate relative thereto.

As a specific embodiment, the damping structure is mounted in such a manner: the inner core 2 is sleeved on the rotary shaft and rotatable together therewith, and the outer casing 1 is fixed on the pot body. More specifically, further referring to FIGS. 4 to 6, the outer wall of the outer casing 1 is provided with a fixing mechanism 12 for fixing with the pot body. The inner core 2 is provided with a first through-hole 22 along a height direction thereof, and both ends of the outer casing 1 are respectively provided with second through-holes 32 corresponding to the position of the first through-hole 22. Specifically, the positioning stud 31 on the bottom surface of the casing body 11 and the positioning stud 31 on the inner wall surface of the end cap 3 are respectively provided with second through-holes 32. The first through-hole 22 and the second through-holes 32 are intended for passage of the rotary shaft. The inner core 2 and the rotary shaft cannot rotate relatively.

Figure 7:
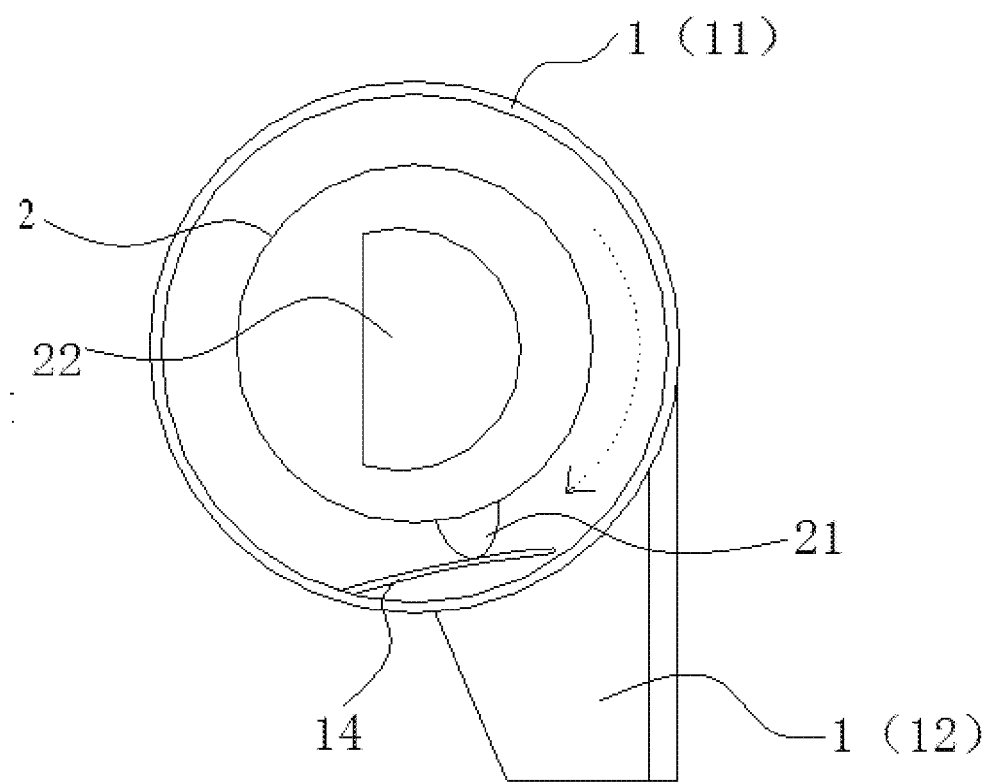
FIG. 7 is a side view of the damping structure provided in Embodiment 2 of the present disclosure after removal of the end cap.

The structure of the fixing mechanism 12 is not particularly limited, as long as there is no relative movement between the outer casing 1 and the pot body. For example, the fixing mechanism 12 is a protrusion insertable into a corresponding groove in the pot body. Referring to FIG. 7, the first through-hole 22 may be arranged in such a manner: the inner core 2 is in a hollow tubular structure, approximate to the intermediate of which a plate-like structure is provided. The first through-hole 22 is disposed in the plate-like structure and has a cross section that is preferably but not limited to a D-shape or a polygonal shape. During opening or closing the pot lid, the inner core 2 is driven to rotate by the rotary shaft, and at the same time, the protrusion 21 is in relative rotation and friction with the elastic piece 14, thereby generating a resistance that hinders the relative rotation between the inner core 2 and the outer casing 1.

Further referring to FIG. 7 (the dashed line with the arrow in FIG. 7 indicates the rotation direction of the inner core 2 during the opening of the pot lid), during at least part of the opening process of the pot lid relative to the pot body, the protrusion 21 extrudes the wall surface of the elastic sheet 14, and rotates from a suspended second end of the elastic sheet 14 to a first end thereof. Also, preferably, the protrusion 21 does not reach the first end of the elastic sheet 14 when the pot lid is completely opened with respect to the pot body.

In this embodiment, during at least part of the opening process of the pot lid relative to the pot body, the protrusion 21 rotates from the second end (i.e., the suspended end) of the elastic sheet 14 to the first end (i.e., the fixed end) of the elastic sheet 14. At an earlier stage of this process, the elastic force of the elastic sheet 14 shows a longer linear change region, which allows easy selection of the elastic sheet 14 as well as control of the elastic force of the elastic sheet 14. However, at a later stage of this process, since the protrusion 21 does not reach the fixed end of the elastic sheet 14, the fixed end of the elastic sheet 14 is subject to less stress and slight deformation, and is less likely to be fractured and has longer service life and high reliability of the whole structure.

The working principle of the damping structure disclosed in this embodiment is as follows:

When being opened, the pot lid drives the inner core 2 with the rotary shaft to rotate. Meanwhile, the protrusion 21 extrudes the wall surface of the elastic sheet 14 and rotates from the second end of the elastic sheet 14 to the first end thereof. When the pot lid is completely opened relative to the pot body, the protrusion 21 does not reach the first end of the elastic piece 14. In the process of opening the pot lid, the elastic sheet 14 is extruded to deform and generate a resistance against the relative rotation between the inner core 2 and the outer casing 1. The elastic sheet 14 can generate different resistances due to different deformations to hinder the relative rotation between the pot lid and the pot body so that the movement of the pot lid in the opening process is smoother.

It should be noted that, as an alternative implementation, in this embodiment, the elastic sheet 14 may also be disposed on the inner core 2, and the protrusion 21 is disposed on the outer casing 1. The first end of the elastic sheet 14 is fixed to the outer wall of the inner core 2, and the second end is arranged in a suspended manner. During at least part of the opening process of the pot lid, the protrusion 21 rotates from the second end of the elastic sheet 14 toward the first end thereof, and the elastic sheet 14 protrudes in a direction away from the inner core 2. As an alternative implementation, in this embodiment, the inner core 2 may be fixed relative to the pot body. For instance, the pot body is provided with a mounting shaft on which the inner core 2 is sleeved. The inner core 2 and the mounting shaft cannot rotate relative to each other. The outer casing 1 is directly or indirectly driven by the rotary shaft to rotate in the process of opening or closing the pot lid. In addition, the application of the damping structure provided in this embodiment is not limited to cooking appliances. Instead, where appropriate, the damping structure may also be applied to other devices that need buffering, which devices comprise a first body and a second body that are rotatably connected by means of a rotary shaft and a torsion spring. The first body is fixed to the outer casing 1 or the inner core 2 and the second body are rotatable relative to the outer casing 1 by driving the inner core 2 with the rotary shaft. During at least part of the opening process of the second body relative to the first body, the protrusion 21 extrudes the wall surface of the elastic sheet 14, and rotates from the second end to the first end.

Embodiment 3

Figure 8:
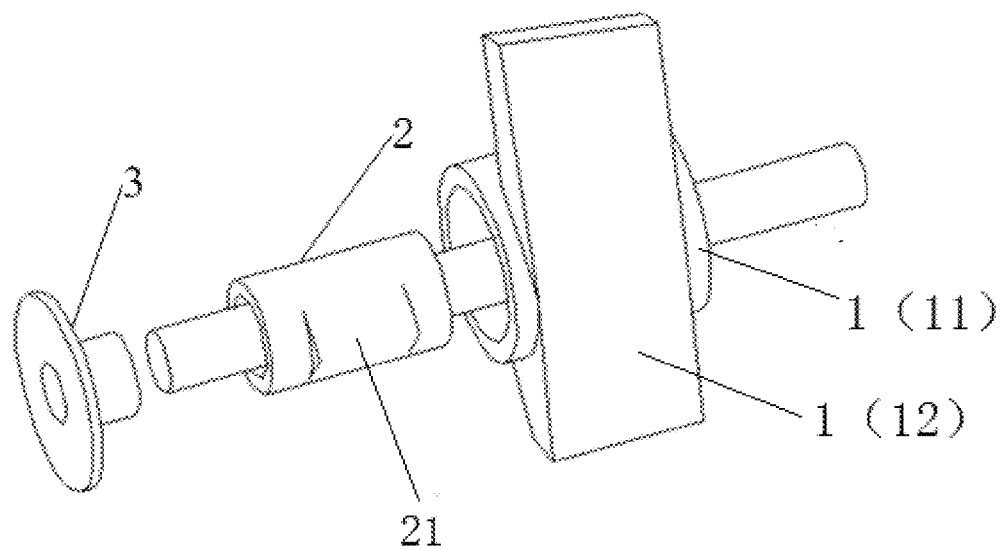
FIG. 8 is an assembling view of each component of the damping device according to Embodiment 3 of the present disclosure.

As shown in FIGS. 8-11, the embodiment according to the present disclosure provides a damping device. FIG. 8 shows the assembling of each component of the damping device of the present disclosure, in which the reference numeral 2 represents the inner core, 1 the outer casing, 11 the fixed member, 12 the supporting member, and 3 the end cap.

As shown in FIG. 8, the damping device is arranged between the cover body and the main body, and comprises an inner core 2 an outer side wall of which is provided with a friction member, and an outer casing 1 which comprises a fixed member 11 and a supporting member 12. An elastic piece is arranged on an inner wall of the fixed member 11 to bring the friction member into contact with the elastic piece to generate damping friction. The supporting member 12 is disposed on an outer periphery of the fixed part 11 and comprises a first cantilever extending toward a first direction from an outer peripheral wall of the fixed member 11 and a second cantilever extending toward a second direction from the outer peripheral wall of the fixed member 11. The outer casing 1 of the present disclosure includes the fixed member 11 and the supporting member 12 arranged on the outer periphery of the fixed member 11 and comprising a first cantilever extending toward a first direction from the outer peripheral wall of the fixed member 11 and a second cantilever extending toward a second direction from the outer peripheral wall of the fixed member 11. In this way, the outer casing 1 can provide a stress point for itself by using the first cantilever and the second cantilever of the supporting member 12 to bring the outer casing 1 into contact with the cooking body of the cooker 6, thereby simplifying the structure of the existing damping devices and occupying smaller space by the damping device.

Since the outer casing 1 is able to provide a stress point for itself by using the first cantilever and the second cantilever of the supporting member 12, the damping device according to the present disclosure, compared with existing damping devices, may reduce an external supporting member. Therefore, compared with existing damping devices, the damping device of the present disclosure not only has a simple structure, but also saves the space occupied.

As shown in FIG. 8, the supporting member 12 of the outer casing 1 includes a first cantilever extending toward a first direction from an outer peripheral wall of the fixed member 11 and a second cantilever extending toward a second direction from the outer peripheral wall of the fixed member 11, and the first direction corresponding to the first cantilever is opposite to the second direction corresponding to the second cantilever. In this way, the outer casing 1 can provide a stress point for itself by using the first cantilever and the second cantilever of the supporting member 12 to bring the outer casing 1 into contact with the cooking body of the cooker 6, thereby obtaining a damping device with a simple structure and small occupied space.

In order to allow for better fitting between the inner core 2 and the outer casing 1, the fixed member 11 has a cavity having openings at both ends and the inner core 2 may be arranged in the cavity of the fixed member 11.

In order to reduce the space occupied by the damping device of the present disclosure, the fixed member 11 and the supporting member 12 of the outer casing 1 can be designed into a one-piece configuration. In this way, the damping device of the present disclosure may be disposed between the lid and the cooking body of the cooker 6 with smaller volume.

In the damping device of the present disclosure, the deformation corresponding to the damping friction between the friction member and the elastic piece matches the buffer force corresponding to the damping friction. Specifically, the greater the deformation corresponding to the damping friction between the friction member and the elastic piece is, the greater the buffer force generated by the damping friction is, and vice versa.

In the damping device of the present disclosure, in order to increase the buffer force generated by damping friction between the friction member and the elastic piece, the friction member of the inner core 1 is designed as a bump protruding from the outer surface of the inner core 2. In practice, a plurality of bumps may be arranged on the outer surface of the inner core 2 in a symmetrical and uniform manner.

The inner core 2 is fixed on the cover body by means of a hinge shaft, and has a D-shaped hole matched with the shape of the hinge shaft. In this way, the inner core 2 is fitted with the hinge shaft for movement, and moves synchronously with the cover body during the opening or closing of the cover body.

In order to firmly arrange the inner core 2 in the cavity of the fixed member 11 of the outer casing 1, the openings at both ends of the outer casing 1 are provided with end caps 3.

Figure 9:
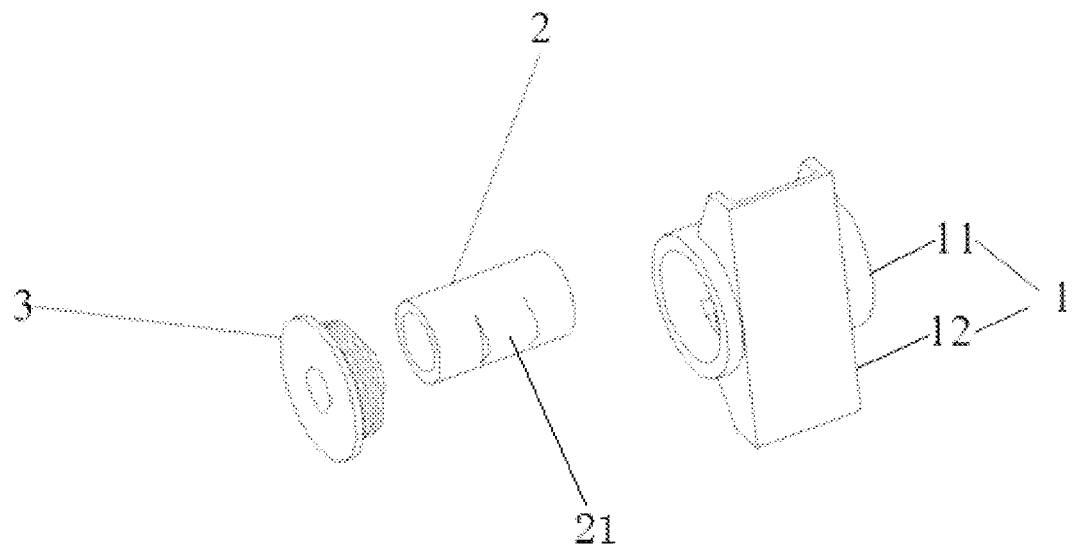
FIG. 9 is a structural view of each component of the damping device according to Embodiment 3 of the present disclosure.

FIG. 9 is a structural view of each component of the damping device of the present disclosure, wherein the reference numeral 2 represents the inner core, 1 the outer casing, 11 the fixed member, 12 the supporting member, and 3 the end cap. Reference is made to the illustration of FIG. 8 and detailed depiction will not be repeated here. The structural view of each component is only to show the structure of each component of the damping device of the present disclosure more clearly.

Figure 10:
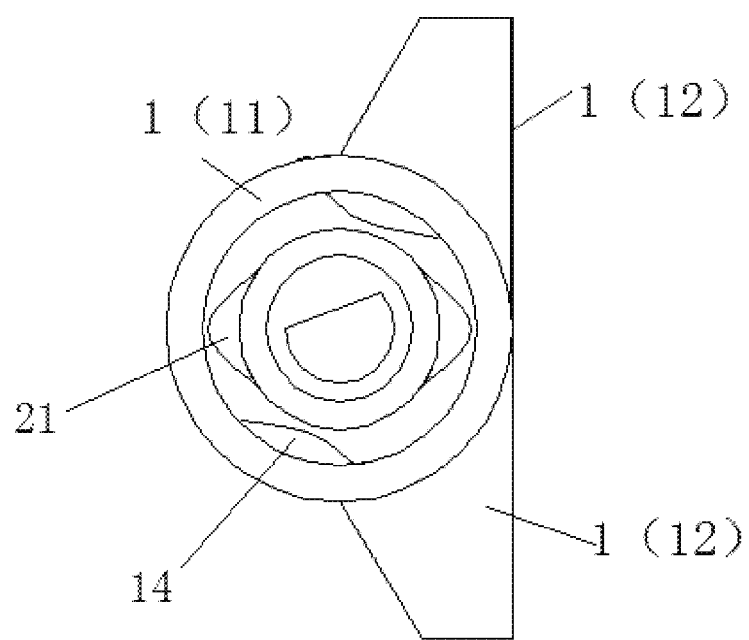
FIG. 10 is a structural view of an elastic cantilever within the outer casing according to Embodiment 3 of the present disclosure.

FIG. 10 is a structural view of the elastic cantilever in the outer casing of the present disclosure, wherein the reference numeral 1 represents the outer casing. Reference is made to the illustration of FIG. 8 and detailed depiction will not be repeated here.

Figure 11:
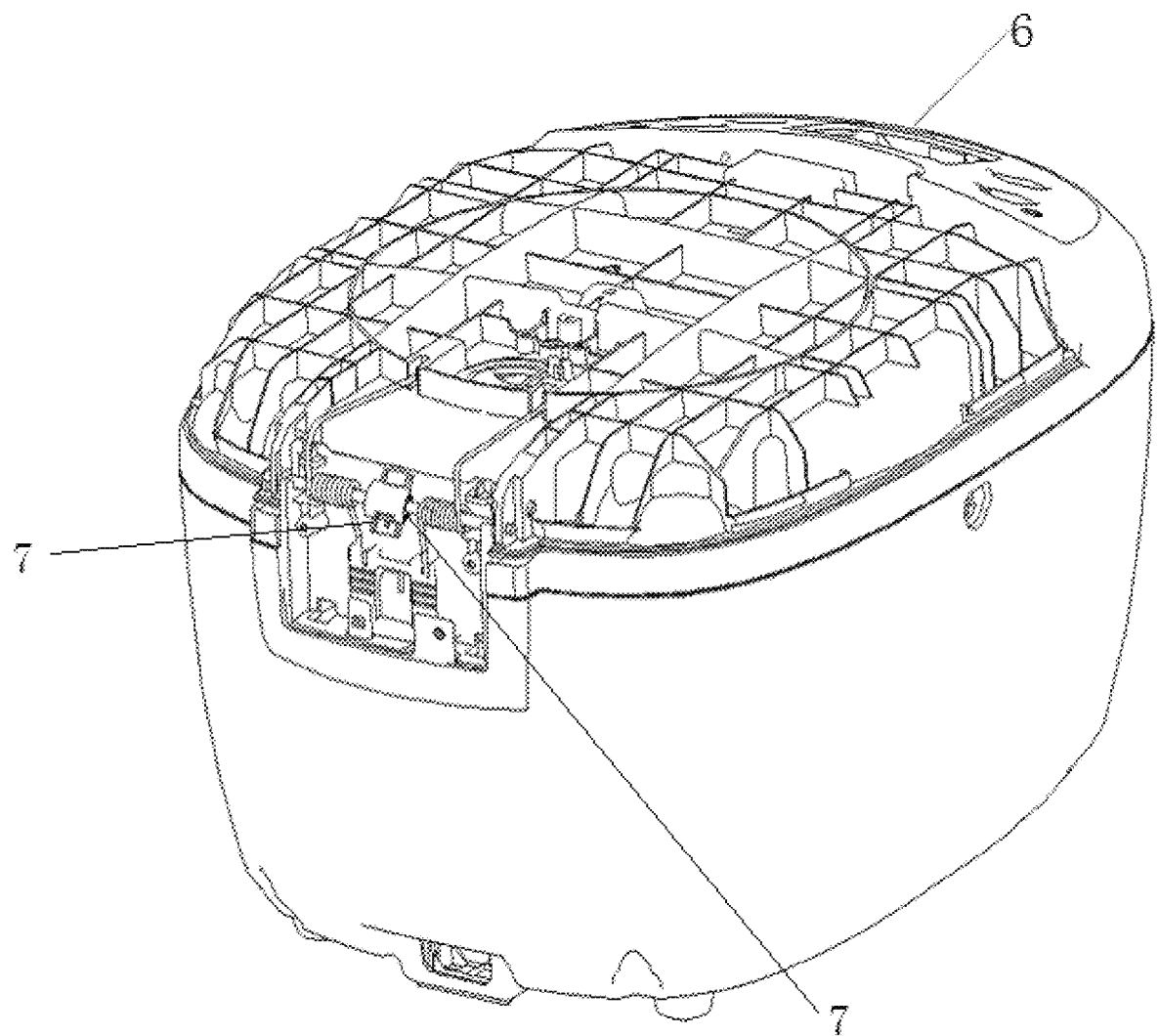
FIG. 11 is a structural view of the cooker according to Embodiment 3 of the present disclosure.

FIG. 11 is a structural view of the cooker of the present disclosure, wherein the reference numeral 6 represents the cooker. The structure of the damping device used in combination with the cooker 6 can be seen from FIG. 11. The detailed illustration of the damping device refers to FIG. 8 and will not be repeated here.

According to the technical solution of the present disclosure, the damping device is arranged between the cover body and the main body and comprises an inner core 2 an outer side wall of which is provided with a friction member, and an outer casing 1 which comprises a fixed member 11 and a supporting member 12. An elastic piece is arranged on an inner wall of the fixed member 11 to bring the friction member into contact with the elastic piece to generate damping friction. The supporting member 12 is disposed on an outer periphery of the fixed member 11 and comprises a first cantilever extending toward a first direction from an outer peripheral wall of the fixed member 11 and a second cantilever extending toward a second direction from the outer peripheral wall of the fixed member 11. The outer casing 1 of the present disclosure includes a fixed member 11 and a supporting member 12 arranged on the outer periphery of the fixed member 11 and comprising a first cantilever extending toward a first direction from the outer peripheral wall of the fixed member 11 and a second cantilever extending toward a second direction from the outer peripheral wall of the fixed member 11. In this way, the outer casing 1 can provide a stress point for itself by using the first cantilever and the second cantilever of the supporting member 12 to bring the outer casing 1 into contact with the cooking body of the cooker 6, thereby obtaining a damping device having a simple structure and occupying small space.

Furthermore, in the technical solution of the present disclosure, the first direction and the second direction are opposite. In this way, the outer casing 1 can provide a stress point for itself by using the first cantilever and the second cantilever of the supporting member 12 to bring the outer casing 1 into contact with the cooking body of the cooker 6, thereby obtaining a damping device having a simple structure and occupying small space.

Further, according to the technical solution of the present disclosure, the fixed member 11 has a cavity having openings at both ends, and the inner core 2 can be disposed in the cavity of the fixed member 11 to facilitate fitting between the inner core 2 and the outer casing 1.

According to the embodiments of the present disclosure, a cooker 6 is further provided, comprising the damping device illustrated above.

The cooker 6 of the present disclosure also comprises a cooking body and a lid fixed thereto. The lid is fixed to the cooking body by means of a hinge shaft to which the inner core 2 is fixed, wherein the hinge shaft is D-shaped.

In order to prevent lateral movement of the damping device of the present disclosure, the cooking body is also provided with at least two limiting ribs 7. The supporting member 12 of the outer casing 1 of the damping device is insertable into a cavity formed by adjacent limiting ribs 7 to limit the supporting member 12. Specifically, the limiting ribs 7 have a shape that matches the shape of the supporting member 12, so that the supporting member 12 is insertable into the cavity formed by the adjacent limiting ribs 7. Besides, the size of the limiting ribs 7 also matches the size of the supporting member 12, so that the supporting member 12 is insertable into the cavity formed by the adjacent limiting ribs 7.

Since the cooker 6 of the present disclosure includes a damping device having a simple structure and occupying small space, the volume of the cooker 6 of the present disclosure can be reduced accordingly.

In addition, the damping device of the cooker 6 of the present disclosure comprises an inner core 2 an outer side wall of which is provided with a friction member, and an outer casing 1 which comprises a fixed member 11 and a supporting member 12. An elastic piece is arranged on an inner wall of the fixed member 11 to bring the friction member into contact with the elastic piece to generate damping friction, thereby creating sufficient buffer force with the damping friction to open or close the lid of the cooker 6 smoothly. This reduces the problems of non-full-opening or jumping open of the lid of the existing cookers 6 to improve user experience.

Embodiment 4

Figure 12:
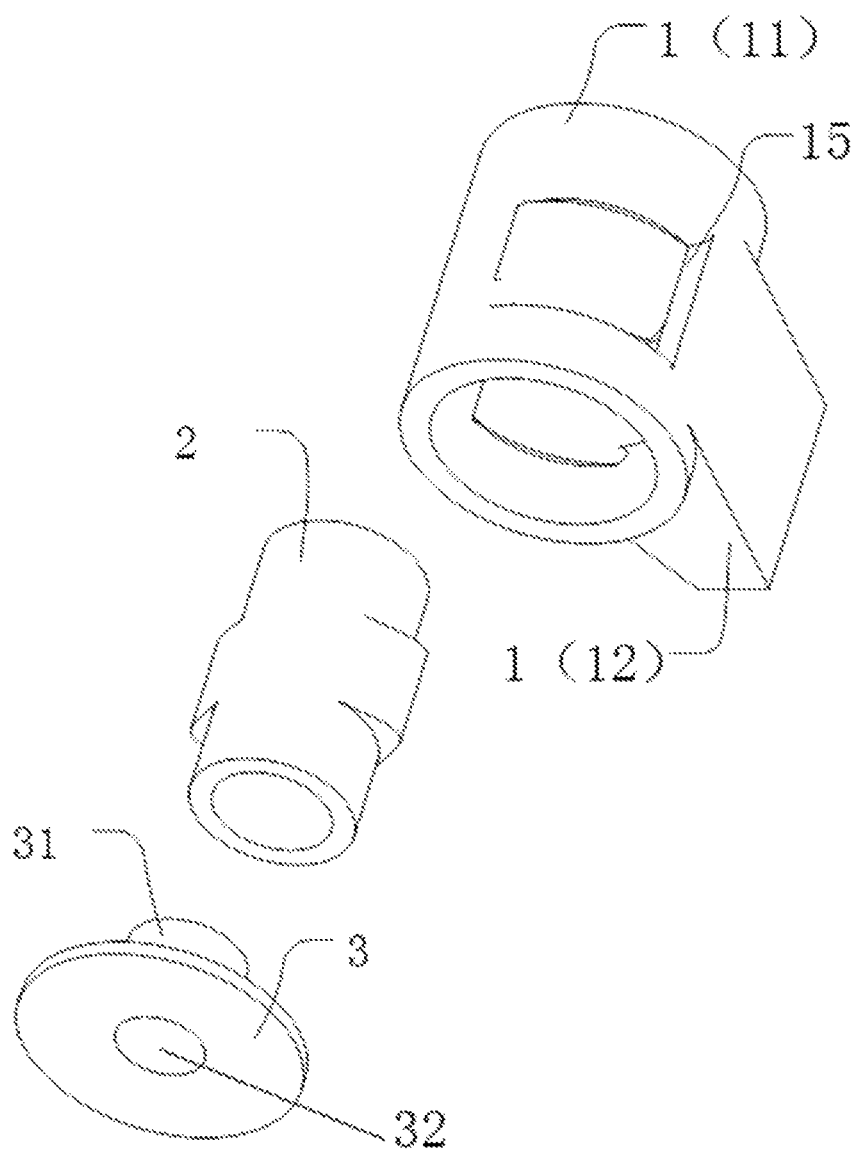
FIG. 12 is an exploded structural view of the damping device of Embodiment 4 of the present disclosure.
Figure 13:
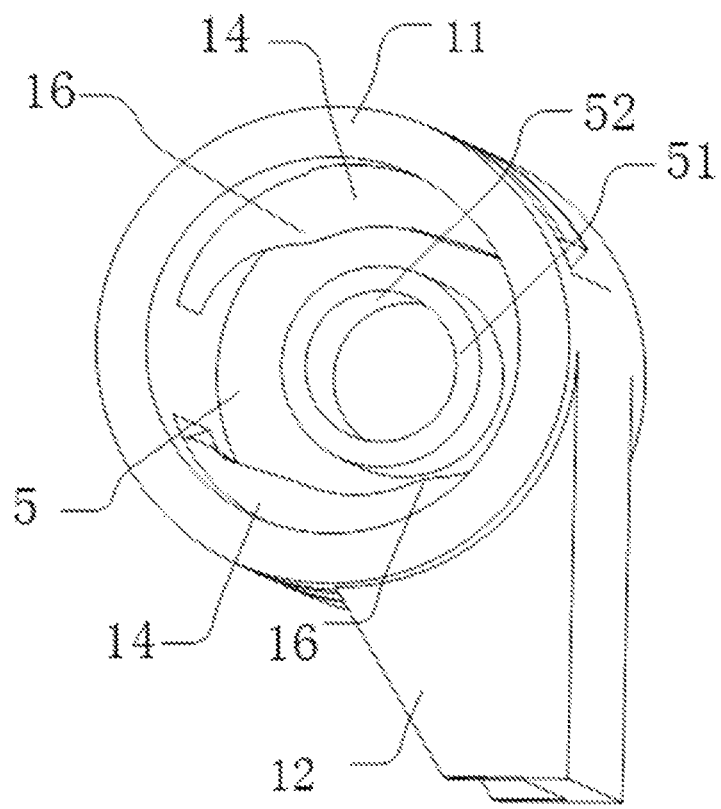
FIG. 13 is a structural view of the housing of Embodiment 4.
Figure 14:
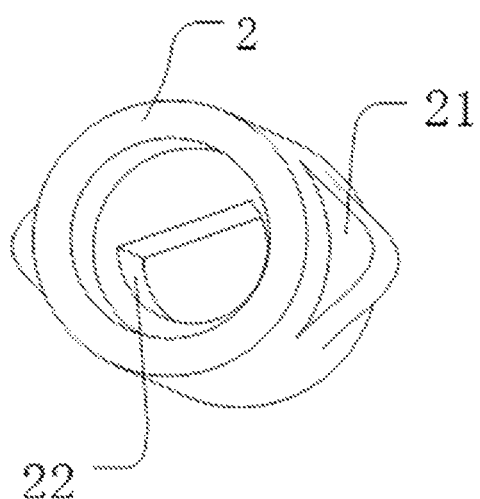
FIG. 14 is a structural view of the inner core of Embodiment 4.

As shown in FIGS. 12-14, the damper of the present disclosure is used to provide damping for the relative movement between two hinged portions. For instance, for a pot with a cover body hinged to a main body, like an electric rice cooker, it is possible to provide a damping force during the opening of the cover body. As shown in FIG. 12, the damper of the present disclosure comprises a housing 1, an inner core 2 and an end cap 3, wherein the inner core 2 is rotatably arranged in the housing 1, and defined in the housing 1 by the end cap 3. The housing 1 is provided therein with a limiting portion 16 for limiting the rotation of the inner core 2.

As shown in FIG. 13, the housing 1 includes a main body 11 which has a cylindrical form and a mounting portion 12 which is connected to an outer wall of the main body 11. The mounting portion 12 functions to limit or mount the housing 1 to prevent relative movement between the main body 11 and the pot. Preferably, in this embodiment, the mounting portion 12 is a protruding structure formed on the outer wall of the main body 11. The specific shape and number of the protruding structure are not defined, as long as the limiting and fixing function is effective. Preferably, the mounting portion 12 is provided with a mounting hole so as to be fitted and mounted with for example a bolt.

In a preferred embodiment, there is one end cap 3. In this embodiment, a first end of the main body 11 is provided with a baffle 5 intended to block the first end of the main body 11, and a second end of the main body 11 is used for mounting the end cap 3. In other embodiments, there may be two end caps 3, one of which has the same function as the baffle 5. Preferably, the baffle 5 is provided with a first supporting member 51 on an internal surface of the main body 11. The first supporting member 51 has a column or cylindrical structure for supporting the inner core 2 and enabling the inner core 2 to rotate (described in detail below). An axis of the first supporting member 51 is preferably collinear with an axis of the main body 11. Preferably, the first supporting member 51 is provided with a first through-hole 52 for achieving connection between the inner core 2 and a moving member that is a hinge shaft between the cover body and the pot. The first through-hole 52 runs through the first supporting member 51 and the baffle 5, and has an axis that is collinear with the axis of the first supporting member 51.

In a preferred embodiment, an inner wall of the main body 11 is provided with a damping structure 14 for providing a damping force to the rotation of the inner core 2. Preferably, the damping structure 14 is an elastic elongated structure that extends along a circumferential direction of the inner wall of the main body 11. Preferably, the damping structure 14 is an elongated structure with a certain radian, or a surface thereof contacting with the inner core 2 is an arc-shaped surface, in order to provide a greater damping force and achieve more stable operation of the inner core 2. The arc-shaped surface of the damping structure 14 may be designed to have a regular or irregular shape according to the requirement of the necessary damping force, and further preferably, the damping structure 14 is an elastic metal sheet. One end of the damping structure 14 is fixedly connected to the inner wall of the main body 11, and the other end is a free end. The inner core 2, when moved, contacts with the damping structure 14 and applies an extrusion force onto the damping structure 14 with the movement of the inner core 2 to elastically deform the damping structure 14. At the same time, the damping structure 14 provides a varying damping force to the inner core 2 during the deformation process. The inner core 2, when moving, preferably first contacts with the free end of the damping structure 14. A joint between the damping structure 14 and the inner wall of the main body 11 extends a certain length along the inner wall of the main body 11 to increase a joint area of the damping structure 14 and the main body 11, so that, when the damping structure 14 is deformed, the same change also takes place at the point of the joint where the damping structure 14 and the main body 11 are deformed as a function of different deformations, which prevents fracture caused by over deformation at the same point or excessive deformations, thereby improving the strength and operation reliability of the damping structure 14. Further, the damping structure 14 has a greater thickness at an intermediate portion thereof than at both ends in its extension direction so as to improve the strength of the damping structure 14 without affecting the deformation performance thereof. Preferably, the limiting portion 16 is formed on the damping structure 14 and disposed at a position near the joint between the damping structure 14 and the main body 11, such that the inner core 2 cannot continue moving when moving to a position where it comes into contact with the blocking structure, hence limiting the movement of the inner core 2. The limiting portion 16 preferably includes a protruding structure formed on the contact surface of the damping structure 14 and the inner core 2. Preferably, there is one damping structure 14, or there are two opposite damping structures.

Preferably, a dodge structure 15 is provided on the inner wall of the main body 11 at a position corresponding to the damping structure 14 so as to provide space for deformation of the damping structure 14. The dodge structure 15 may be a grooved structure on the inner wall of the main body 11 corresponding to the position of the damping structure 14, or may be designed as a through-hole penetrating in the radial direction of the main body 11. When the inner core 2 contacts with the damping structure 14 and provides an extrusion force, the damping structure 130 will move into the dodge structure 15 to elastically deform.

As shown in FIGS. 12 and 14, the main body of the inner core 2 is of a cylindrical form on the outer wall of which the protrusion 21 is provided. The axial and radial dimensions of the inner core 2 are smaller than those of the housing 1, such that the inner core 2 can be mounted in the main body 11 of the housing 1 and rotate relative to the housing 1 therein. When the inner core 2 is mounted in the main body 11, the first supporting member 51 is inserted into one end of the inner core 2, or when the first supporting member 51 is of a cylindrical form, one end of the inner core 2 may be inserted into the first supporting member 51. A limiting hole 22 is formed in the inner core 2 and cooperates with a connecting shaft of a component concerned, such as a driving component, so that the inner core 2 can rotate with the connecting shaft which is preferably a hinge shaft of a cooker and a cover body. Preferably, the limiting hole 22 is D-shaped. The bump 21 can contact with the damping structure 14 and provide an extrusion force to the damping structure 14 during the movement of the inner core 2. Preferably, for smooth operation, a surface of the bump 21 in contact with the damping structure 14 is a curved surface. The position and number of the bump 21 correspond to those of the damping structure 14, such that the bump 21 is not in contact with the damping structure 14 when the inner core 2 is in the initial position, and the bump 21 comes into contact with the damping structure 14 when the inner core 2 is in rotation and movement. When the bump 21 is in contact with the limiting portion 16 on the damping structure 14, the inner core stops moving.

As shown in FIG. 12, the end cap 3 is capable of covering the second end of the housing 1 and limiting the inner core 2 within the housing 1. A surface of the end cap 3 inside the housing 1 is provided with a second supporting member 31 which preferably has the same structure as the first supporting member 51, that is, the second supporting member 31 is in a column or cylindrical form with an axis collinear with the axis of the main body 11. Preferably, the second supporting member 31 is provided with a through-hole for connecting the inner core 2 with other components. The through-hole penetrates through the second supporting member 31, and has an axis that is collinear with the axis of the second supporting member 31.

The present disclosure also provides a cooker (which is also called a stewing appliance). The stewing appliance comprises a pot body and a cover body hinged onto the pot body. The stewing appliance is provided with the damper to realize smooth opening of the cover body without problems such as jumping open or non-full-opening. Preferably, the damper is arranged on the pot body of the stewing appliance, and the housing 1 is fixed to the pot body. The inner core 2 is connected with a hinge shaft of the pot body and the cover body, and the hinge shaft is rotated with the opening or closing of the cover body, thereby driving the inner core 2 to rotate. Preferably, the stewing appliance is an electric rice cooker, an electric pressure cooker, etc.

The damper provided by the present disclosure limits the rotation of the inner core by arranging a limiting portion on the damping structure, such that the damper functions for limiting while providing a damping force, and increases a connection area of the damping structure and the housing to improve the strength of the damping structure and the reliability of the damper.

Embodiment 5

Figure 15:
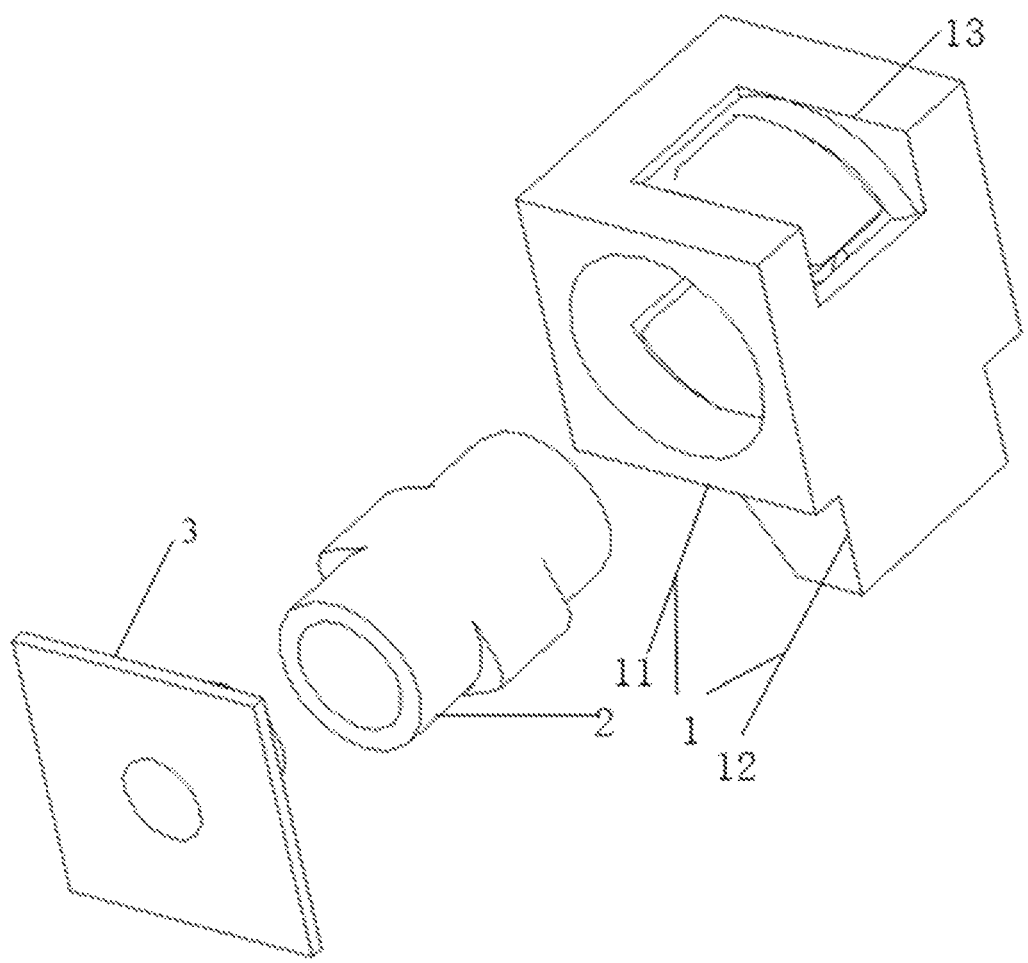
FIG. 15 is a structural view of each component of the damping device according to Embodiment 5 of the present disclosure.

According to an embodiment of the present disclosure, a damping device is provided, a structural view of each component of which is shown in FIG. 15, wherein the reference numeral 2 represents the inner core, 1 the outer casing, 11 the fixed member, 13 the notch or opening, 12 the supporting member, and 3 the end cap.

As illustrated in FIG. 15, the damping device is arranged between the cover body and the main body and comprises an inner core 2 an outer side wall of which is provided with a friction member, and an outer casing 1 which comprises a fixed member 11. An elastic piece is arranged on the inner wall of the fixed member 11 to bring the friction member into contact with the elastic piece to generate damping friction. The fixed member 11 has a cavity having openings at both ends so as to arrange the inner core 2 therein. The fixed member 11 has a square outer contour. In this way, due to the square shape of the outer contour of the fixed member 11 of the outer casing 1, the area of the outer casing 1 is increased. Because of the increase in the area, the outer casing 1 of the damping device will have increased strength and will be less likely to be damaged. At the meantime, the service life of the damping device is increased.

As shown in FIG. 15, a notch 13 is formed on the outer peripheral wall of the fixed member 11 at a position corresponding to the elastic piece. The position of the inner wall of the fixed member 11 abutting against the elastic piece has an arc structure which is at the position of the notch 13. This facilitates the contact between the friction member of the inner core 2 and the elastic piece of the fixed member 11, and creates damping friction due to the contact. Since the square outer contour of the fixed member 11 of the outer casing 1 increases the area of the outer casing 1, the strength of the outer casing 1 can be increased as well. However, due to the square outer contour of the fixed member 11 of the outer casing 1, in order to prevent limiting the contact between the friction member of the inner core 2 and the elastic piece of the fixed member 11, the notch 13 is formed on the outer peripheral wall of the fixed member 11 at a position corresponding to the elastic piece. The arrangement of the notch 13 can facilitate the contact between the friction member of the inner core 2 and the elastic piece of the fixed member 11, thus creating damping friction due to the contact so as to generate a buffer force capable of smoothly opening the cover body of the cooker.

As shown in FIG. 15, in addition to the fixed member 11, the outer casing 1 further comprises a supporting member 12 for fixing the outer casing 1 to the main body. In this way, the outer casing 1 can be fixed to the main body by the supporting member 12.

In order to simplify the structure of the damping device, the fixed member 11 of the outer casing 1 and the supporting member 12 of the outer casing 1 can be designed into a one-piece configuration. This not only simplifies the structure of the damping device, but also saves the space occupied by the damping device.

In the damping device of the present disclosure, the deformation corresponding to the damping friction between the friction member and the elastic piece matches the buffer force corresponding to the damping friction. Specifically, the greater the deformation corresponding to the damping friction between the friction member and the elastic piece is, the greater the buffer force generated by the damping friction is, and vice versa.

In the damping device of the present disclosure, in order to increase the buffer force generated by damping friction between the friction member and the elastic piece, the friction member of the inner core 2 is designed as a bump protruding from the outer surface of the inner core 2. In practice, a plurality of bumps may be arranged on the outer surface of the inner core 2 in a symmetrical and uniform manner.

The inner core 2 is fixed on the cover body by means of the hinge shaft, and has a D-shaped hole matched with the shape of the hinge shaft. In this way, the inner core 2 is fitted with the hinge shaft for movement, and moves synchronously with the cover body during the opening or closing of the cover body.

In order to firmly arrange the inner core 2 in the cavity of the fixed member 11, the openings at both open ends of the outer casing 1 are provided with an end cap 3.

As shown in FIG. 15, the fixed member 11 has a first end face and a second end face opposite to each other, and the cavity is formed in the fixed member 11 and runs through the first end face and the second end face. The inner core 2 is arranged in the cavity. The inner core 2, in addition to being arranged in the cavity, can be extended out of the cavity slightly. The end cap 3 comprises a first end cap and a second end cap, wherein the shape of the first end cap matches the shape of the first end face, and the shape of the second end cap matches the shape of the second end face.

Figure 16:
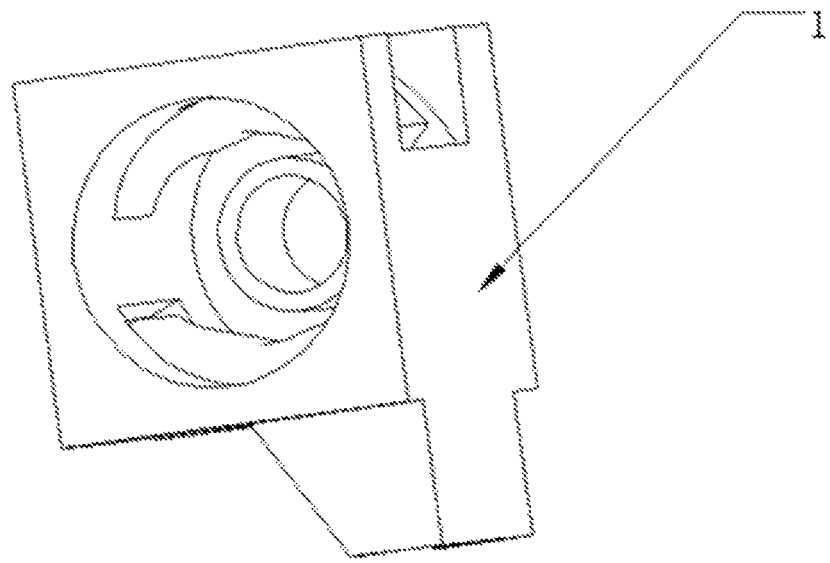
FIG. 16 is an enlarged view of the structure of the outer casing in the damping device according to Embodiment 5 of the present disclosure.

FIG. 16 is an enlarged view of the structure of the outer casing in the damping device of the present disclosure, where the reference numeral 1 represents the outer casing. FIG. 16 is only intended to show the structure of the outer casing 1 more clearly. The detailed illustration of the outer casing refers to the depiction of FIG. 15 and will not be repeated here.

Figure 17:
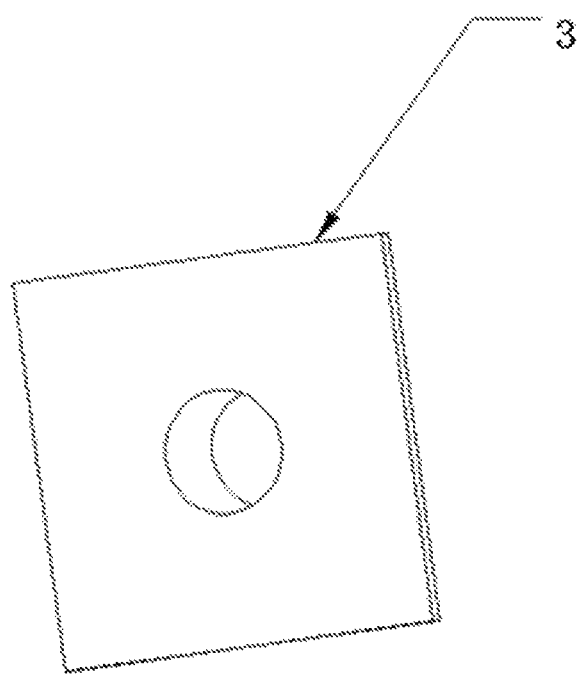
FIG. 17 is an enlarged view of the structure of the end cap in the damping device according to Embodiment 5 of the present disclosure.
Figure 18:
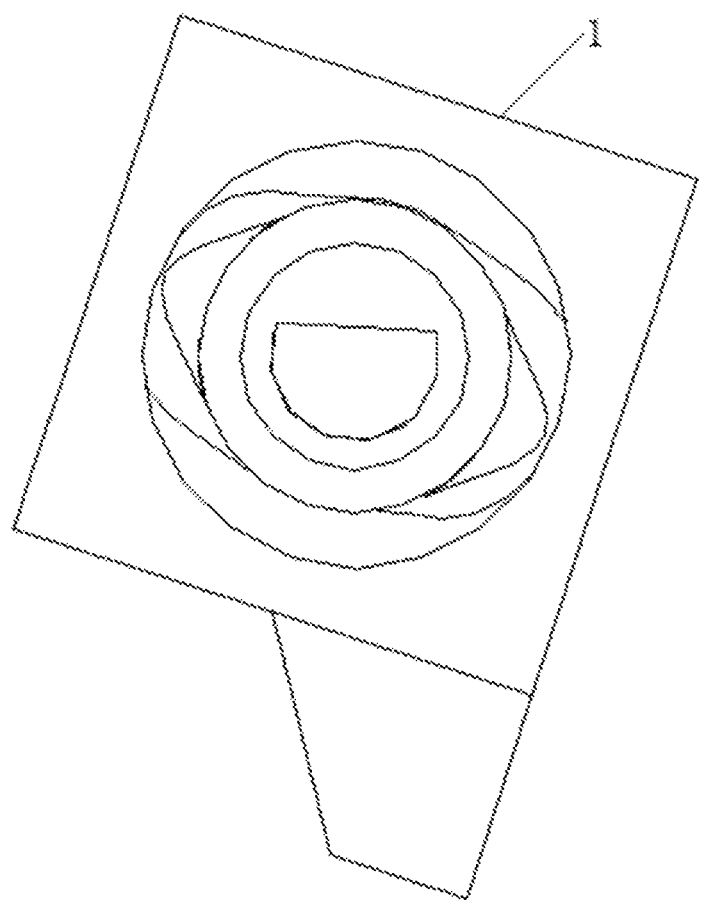
FIG. 18 is another structural view of the damping device according to Embodiment 5 of the present disclosure.

FIG. 17 is an enlarged view of the structure of the end cap in the damping device of the present disclosure, where the reference numeral 3 represents the end cap. FIG. 18 is only intended to show the structure of the end cap more clearly. The detailed illustration of the end cap refers to the depiction of FIG. 15 and will not be repeated here.

FIG. 18 shows another structure in the damping device of the present disclosure, where the reference numeral 1 represents the outer casing. FIG. 18 is only intended to show the structure of the outer casing more clearly. The detailed illustration of the outer casing refers to the depiction of FIG. 15 and will not be repeated here.

According to the technical solution of the present disclosure, the damping device is arranged between the cover body and the main body and comprises an inner core 2 an outer side wall of which is provided with a friction member, and an outer casing 1 which comprises a fixed member 11. An elastic piece is arranged on the inner wall of the fixed member 11 to bring the friction member into contact with the elastic piece to generate damping friction. The fixed member 11 has a cavity having openings at two ends so as to arrange the inner core 2 therein. The fixed member 11 has a square outer contour. In this way, due to the square shape of the outer contour of the fixed member 11 of the outer casing 1, the area of the outer casing 1 is increased. Because of the increase in the area, the outer casing 1 of the damping device will have increased strength and will be less likely to be damaged. At the meantime, the service life of the damping device is increased.

Further, according to the technical solution of the present application, a notch 13 is formed on the outer peripheral wall of the fixed member 11 at a position corresponding to the elastic piece. The position of the inner wall of the fixed member 11 abutting against the elastic piece has an arc structure that is at the position of the notch 13. This facilitates the contact between the friction member of the inner core 2 and the elastic piece of the fixed member 11, and creates damping friction due to the contact so as to generate a buffer force for smoothly opening the cover body of the cooker.

Further, according to the technical solution of the present application, the outer casing 1 further comprises a supporting member 12 for fixing the outer casing 1 to the main body. In this way, the outer casing 1 can be fixed to the main body by the supporting member 12.

According to the embodiment of the present disclosure, a cooker is also provided, which comprises the damping device described above. The cooker of the present disclosure also comprises a cooking body and a lid fixed to the cooking body. The lid is fixed to the cooking body by means of a hinge shaft to which the inner core 2 is fixed, wherein the hinge shaft is D-shaped.

Because the damping device is arranged between the cooking body and the lid of the cooker and the strength of the outer casing 1 in the damping device is increased, the outer casing 1 is less likely to be damaged, and meanwhile, the service life of the damping device is increased. Therefore, the service life of the cooker is also increased.

Moreover, as the damping device of the present disclosure is arranged between the cooking body and the lid of the cooker, a notch 13 is formed on the outer peripheral wall of the fixed member 11 at a position corresponding to the elastic piece. The position of the inner wall of the fixed member 11 abutting against the elastic piece has an arc structure that is at the position of the notch 13. The arrangement of the notch 13 facilitates the contact between the friction member of the inner core 2 and the elastic piece of the fixed member 11, thereby creating damping friction due to the contact to generate a buffer force for smoothly opening or closing the cover body. Therefore, it is possible to decrease the problems in the lid of existing cookers, such as non-full-opening or jumping open, thus improving user experience.

In view of the above, it is easy for those skilled in the art to understand that the above preferred embodiments can be freely combined and superimposed in the case where there are no conflicts.

The above description only concerns the embodiments of the present disclosure and is not intended to limit the present disclosure. Various modifications and variations can be made to the present disclosure by those skilled in the art. Any modifications, equivalent substitutions, improvements, etc. made within the spirit and principles of the present disclosure shall be encompassed within the scope defined by the claims of the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A damping device, arranged between a cover body and a cooking body, comprising an inner core and an outer casing,
an outer side wall of inner core being provided with a friction member, and the outer casing comprising a fixed member and a supporting member; the inner wall of the fixed member is provided with an elastic piece so that the friction member can be brought into contact with the elastic piece to create damping friction; the supporting member is arranged on an outer periphery of the fixed member and comprises a first cantilever extending in a first direction from an outer peripheral wall of the fixed member and a second cantilever extending in a second direction from the outer peripheral wall of the fixed member; wherein
the fixed member is provided with a cavity having openings at two ends so as to arrange the inner core in the cavity of the fixed member;
the inner core is in a cylindrical form having a cylindrical outer surface and provided with a through-hole along a height direction of the inner core;
the friction member of the inner core is a protrusion protruding from the cylindrical outer surface of the inner core and protrudes outward along a radial direction of the inner core; the protrusion covers a part of the cylindrical outer surface along an axial direction of the inner core, and from a cross-section view perpendicular to the axis direction, the protrusion has an arc-shaped outer surface, and from a position where the protrusion is connected to the cylindrical outer surface to a top of the protrusion, the protrusion has a tapered width;
the elastic piece is an elastic cantilever, and the elastic cantilever protrudes toward the cylindrical outer surface of the inner core; and the elastic piece is in an arc shape and protrudes in a direction away from the outer casing to simplify the structure of the elastic piece;
the cover body is fixed to the cooking body by means of a hinge shaft to which the inner core is fixed; and
the cooking body is also provided with at least two limiting ribs, and the supporting member can be inserted into a cavity formed by the at least two limiting ribs to limit the supporting member.

2. The damping device according to claim 1, wherein a deformation corresponding to the damping friction between the friction member and the elastic piece matches a buffer force corresponding to the damping friction.

3. A cooker, comprising the damping device according to claim 1.

4. The cooker according to claim 3, wherein the at least two limiting ribs have a shape that matches the shape of the supporting member, so that the supporting member can be inserted into the cavity formed by the at least two limiting ribs.

5. The cooker according to claim 4, wherein the at least two limiting ribs have a size that matches the size of the supporting member, so that the supporting member can be inserted into the cavity formed by the at least two limiting ribs.

6. The cooker of claim 5, wherein the outer casing provide a stress point by using the first cantilever and the second cantilever of the supporting member to bring the outer casing into contact with the cooking body of the cooker.

* * * * *